United States Patent Office 2,850,518
Patented Sept. 2, 1958

2,850,518

AMINO ACID DERIVATIVES

Van R. Gaertner and George A. Richardson, Dayton, Ohio, assignors to Monsanto Chemical Company, St. Louis, Mo., a corporation of Delaware No Drawing. Application July 30, 1956
Serial No. 600,699

3 Claims. (Cl. 260—455)

This invention relates to novel amino acid derivatives. More specifically, this invention relates to a novel class of N-(dithiocarboxy)amino acids. The invention also relates to the use of these novel derivatives as viricides and as intermediates for polypeptide formation.

The novel compounds of this invention are N-(S-aryldithiocarboxy)amino acids in which the amino group is attached directly to a carbon atom which is adjacent to a carbonyl radical and is either an asymmetric carbon atom or a tertiary carbon atom.

These compounds can be utilized to form polypeptides by a reaction represented as follows:

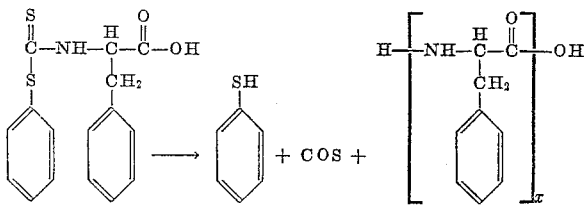

The monothio analogs (namely, the N-(phenylthiocarbonyl)amino acids) have been used before in the preparation of polypeptides. See Chemistry and Industry B. I. F. Review, April 1956, R–34. However, the dithio compounds of the present invention are very much different from the monothio analogs thereof. For example, the monothio derivative of glycine (i. e., N-(phenylthiocarbonyl) glycine) can be used to form polyglycine, whereas attempts to form polyglycine from the corresponding dithio derivative have been completely unsuccessful. On the other hand, in the preparation of polyphenylalanine it took about 200 hours at 80° C. for the monothio derivative to give a polymer having a molecular weight of about 1500 (as determined by amino end group analysis)—whereas with the corresponding dithio derivative of this invention a polymer having a molecular weight of greater than 49,000 was obtained in less than 48 hours. Thus, it can be seen that the dithio derivatives provide an outstanding means for forming high molecular weight polymers of amino acids having the amino group attached to a carbon atom which is (1) adjacent to a carbonyl radical and (2) selected from the group consisting of asymmetric carbon atoms and tertiary carbon atoms.

The N-(S-aryldithiocarboxy)amino acids of the present invention can be prepared by reacting an aryl ester of a halodithioformic acid with the amino acid in which the carboxyl group has been blocked by previous esterification. For example, N-(S-phenyldithiocarboxy)alanine can be prepared by reacting phenyl dithiochloroformate with the ethyl ester of alanine, after which the ethyl group is removed by hydrolysis in aqueous acidic solution. This method is applicable generally to all α-amino acids except glycine, typical of which are alanine, γ-aminoisobutyric acid, valine, leucine, norleucine, isoleucine, phenylalanine, tyrosine, threonine, serine, proline, hydroxyproline, tryptophane, thyroxine, iodogorgoic acid, methionine, cystine, cysteine, lysine, arginine, histidine, aspartic acid, glutamic acid, β-hydroxyglutamic acid, ornithine, and many others. With the more complicated α-amino acids (i. e., ones containing functional or reactive groups in addition to the first carboxyl group and its α-amino group), it will often be necessary to block or protect the additional functional groups in order to keep them from interfering with the desired reactions. For example, hydroxyl or mercapto groups can be readily protected with carbobenzyloxy or benzyl groups. Other protecting groups and techniques for blocking reactive groups are well known in connection with reactions involving amino acid and peptide chemistry, and are generally applicable to the present invention in ways which will be obvious to those skilled in the art.

The present invention is applicable not only to the simple or monomeric amino acids discussed above, but also to those amino acids which are di-, tri-, or higher peptides formed by interaction of two or more different amino acid species. Typical examples of such peptides are leucylglycylglycine, alanylglycine, leucylphenylalanine, alanylleucine, phenylalanylglycylphenylalanine, prolylglycine, norleucylisoleucylnorleucylisoleucine, etc.

Typical aryl halodithioformates for reaction with the above-discussed amino acids are phenyl chlorodithioformate, phenyl bromodithioformate, 2,4-dichlorophenyl chlorodithioformate, α-naphthyl chlorodithioformate, m-tolyl chlorodithioformate, m-tolyl iododithioformate, 2,4-dimethylphenyl chlorodithioformate, 3-ethylphenyl chlorodithioformate, p-(p'-methoxydiphenyl) chlorodithioformate, 2-methyl - 4 - nitrophenyl chlorodithioformate, as well as many others. The term "aryl" as used in connection with the preceding aryl esters of halodithioformic acids includes only those compounds having an aromatic nucleus attached directly to the thiol sulfur atom of the dithioformic acid. The term does not include aralkyl groups (e. g., benzyl groups) which behave very much like alkyl groups and are not suitable for use according to the present invention. On the other hand, certain of the unsaturated heterocyclic compounds (e. g., thiophene, furan, pyridine, etc.) which have aromatic-type resonating structures similar to benzene can be substituted for the aromatic groups mentioned above.

As will be noted from the foregoing description, the compounds of this invention can be classified in two general categories, depending upon the amino acid of which they are a derivative. The first category comprises the N-(S-aryldithiocarboxy) derivatives of those simple (i. e., monomeric) α-amino acids having the α-carbon atom either an asymmetric carbon atom or a tertiary carbon atom. The second category comprises the N-(S-aryldithiocarboxy) derivatives of certain peptides (i. e., peptides in which the amino group is attached to a carbon atom which is adjacent to an amide group and which is either an asymmetric carbon atom or a teritiary carbon atom). These latter peptides are not α-amino acids, but that portion of the peptide which contains the S-(aryldithiocarboxy)-substituted amino group is derived from an α-amino acid of the first category. Thus, in compounds of either category the substituted amino group is on a carbon atom which is (1) adjacent to a carbonyl radical and which is (2) either an asymmetric carbon atom or a tertiary carbon atom.

Examples of compounds within the first category mentioned above are as follows: N-(S-phenyldithiocarboxy)-alanine, N-(S-phenyldithiocarboxy)leucine, α-[N-(phenyldithiocarboxy)amino]-isobutyric acid, N - [S - (2,4-dichlorophenyl)dithiocarboxy]valine, N-[S - (α-naphthyl)-dithiocarboxy]phenylalanine, N-[S - (m - tolyl)dithiocarboxy]proline, N$^\alpha$ - (S - phenyldithiocarboxy)tryptophane, N$^\alpha$-[S-(2,4-dimethylphenyl)dithiocarboxy]lysine, N - [S -

(2-methyl-4-nitrophenyl)dithiocarboxyl]phenylalanine, N-(S-phenyldithiocarboxy)-glutamic acid. etc.

Examples of compounds in the second category are as follows: N-(S-phenyldithiocarboxy)leucylphenylalanine, N-(S-phenyldithiocarboxy)leucylglycylglycine, N-[S-(m-tolyl)dithiocarboxy]prolylglycine, N-[S-(4-nitrophenyl)-dithiocarboxy]norleucylisoleucylnorleucylisoleucine, etc.

The following example is illustrative of the preparation of the N-(S-aryldithiocarboxy)amino acids of the present invention.

*Example 1*

A mixture of 40 grams of phenylalanine and 400 ml. of absolute ethanol was placed in a one liter flask into which hydrogen chloride gas was passed until a clear solution was formed and had become saturated with hydrogen chloride. The excess alcohol and hydrogen chloride was evaporated under reduced pressure, leaving a mushy, syrupy, solid-like residue. The solid was redissolved in 400 ml. of absolute ethanol and again saturated with hydrogen chloride gas. The excess alcohol and hydrogen chloride was again removed by evaporation. The resulting solid was dissolved in 300 ml. of alcohol, reprecipitated by very slow addition of a large excess of ether, and stored overnight at −50° C. This crude material was washed with ether and dried to give a 77% yield of phenylalanine ethyl ester hydrochloride, melting at 153–154° C.

Forty grams of the foregoing phenylalanine ethyl ester hydrochloride, 150 ml. of chloroform and 18 ml. of diethylamine were mixed together in a one liter flask and shaken in an ice bath until the solution had become clear. Ether (450 ml.) was added to precipitate the diethylamine hydrochloride, which was filtered and washed with additional ether. The filtrate was dried in vacuo and then dissolved in 110 ml. of chloroform, to which there was added dropwise a solution of 16.5 grams of phenyl chlorodithioformate in 30 ml. of chloroform. About half way through the addition, it was necessary to add another 140 ml. of chloroform in order to fluidize the resulting reaction mixture. The resulting reaction mixture was washed with three 80-ml. portions of 2 N hydrochloric acid and three 80-ml. portions of water. Chloroform was removed from the mixture under vacuum at 45–50° C. to give an 81% yield of crude product as a deep yellow solid, soluble in benzene, ethyl acetate, chloroform and acetone, but insoluble in water. The crude product was recrystallized from methanol to give the ethyl ester of N-(S-phenyldithiocarboxy)phenylalanine, melting at 150–107° C. Analysis, calculated (as $C_{18}H_{19}NO_2S_2$): C, 62.58%; H, 5.54%; N, 4.05%; S, 18.56%; found: C, 62.92%; H, 5.96%; N, 4.54%; S, 18.52%.

Twenty grams of the foregoing ethyl ester of N-(S-phenyldithiocarboxy)phenylalanine was refluxed in 570 ml. of an equal volume mixture of glacial acetic acid and concentrated hydrochloric acid for about 2 hours until a clear, yellow solution had formed. This solution was cooled and added to 1.5 liters of cold water from which a red syrup settled out and crystallized after standing for about 2 days. This crude crystalline product was purified by repeatedly dissolving in boiling benzene and recrystallizing by cautious addition of hexane. The purified product, N-(S-phenyldithiocarboxy)phenylalanine, was a pure white, needle-like, crystalline solid melting 116–117.5° C. Analysis, calculated (as $C_{16}H_{15}NO_2S_2$): N, 4.41%; S, 20.20%; found: N, 4.68%; S, 19.18%.

The compounds of the present invention are outstanding in several respects. One outstanding aspect is their high biological activity as viricides. This is illustrated in the following example dealing with tobacco mosaic virus.

*Example 2*

A healthy tobacco leaf (*Nicotinium xanthium*) was inoculated with tobacco mosaic virus by rubbing the leaf with a gauze pad soaked with a phosphate buffered (pH of 7.3) solution containing 200 micrograms of the virus per milliliter. The inoculated leaf was incubated under an inverted glass beaker with its petiole in water for approximately 24 hours. Twelve circular disks of equal size (approximately 1 centimeter diameter) were then cut from the leaf tissue and rinsed with sterile distilled water. Six disks were placed in each of two sterile Petri dishes each containing 15 milliliters of half-strength Vickery's solution. One of the solutions also contained a $10^{-5}$ M concentration of N-(S-phenyldithiocarboxy)phenylalanine. The leaf disks were left in these solutions under artificial light (fluorescent "daylight" lamps) at 70° F. ±2° for one week, after which the disks were homogenized and centrifuged to recover the virus therefrom according to standard laboratory techniques. The amount of virus recovered from each set of disks were determined by optical density measurements of solutions containing such virus. In this way it was found that $10^{-5}$ M concentration of N-(S-phenyldithiocarboxy)phenylalanine caused a 72% (average of two replications) inhibition of virus synthesis. The same procedure carried out with the dithiocarboxyphenylalanine present at a concentration of $5 \times 10^{-5}$ M, resulted in 81% inhibition.

Another outstanding aspect of the present compounds is their unusual reactivity with respect to polypeptide formation, especially high molecular weight polypeptides. This polypeptide formation is generally carried out by heating the present compounds in the presence of catalytic amounts of pyridine or other organic tertiary nitrogen bases, such as quinoline, triethylamine, N,N-dimethylaniline, and homologues of the foregoing. The reaction times and temperatures involved in the polypeptide formation will depend to a considerable extent upon the degree of polymerization and the yield of polypeptide which is desired. Typical temperatures will generally be between about 30° C. and about 100° C., with corresponding reaction times varying from several days to a few hours. In general, both molecular weight and yield will increase with increasing time and will decrease with increasing temperatures. Additional details with respect to the polypeptide formation will be apparent from the following example.

*Example 3*

Seven grams of N-(S-phenyldithiocarboxy)phenylalanine, 125 ml. of benzene and 1.27 ml. of pyridine were heated at reflux for 2 days in a 200 ml. flask. After that time the solution became very thick and a fibrous, thread-like precipitate formed during a period of about 1 hour. The product was filtered and washed with benzene, ground in a mortar, again washed with benzene and filtered. Analysis of the resulting polyphenylalanine for amino end groups established the molecular weight of the polymer as 49,800.

The above-described polymerization is not restricted to the formation of homopolymers, but is equally applicable to formation of interpolymers of two or more of the N-(S-aryldithiocarboxy)amino acids described herein.

We claim:

1. An N-(S-aryldithiocarboxy)amino acid in which said amino group is attached to a carbon atom which is (1) adjacent to a carbonyl group and (2) selected from the group consisting of asymmetric carbon atoms and tertiary carbon atoms.

2. N-(S-aryldithiocarboxy)phenylalanine.

3. N-(S-phenyldithiocarboxy)phenylalanine.

References Cited in the file of this patent

UNITED STATES PATENTS

| | | |
|---|---|---|
| 2,139,256 | Bousquet | Dec. 6, 1938 |
| 2,166,120 | Bousquet | July 18, 1939 |
| 2,563,743 | Plentl | Aug. 7, 1951 |
| 2,581,814 | Plentl | Jan. 8, 1952 |
| 2,608,575 | Mathes | Aug. 26, 1952 |
| 2,628,971 | Booth et al. | Feb. 17, 1953 |